Dec. 23, 1952 M. P. KULP ET AL 2,622,855
APPARATUS FOR PRODUCING VISCOSE
Filed Nov. 19, 1949 3 Sheets-Sheet 1

INVENTORS.
MAURICE P. KULP
CHARLES D. VANDENBURGH
BY Thomas R. O'Nally

Dec. 23, 1952 M. P. KULP ET AL 2,622,855
APPARATUS FOR PRODUCING VISCOSE
Filed Nov. 19, 1949 3 Sheets-Sheet 2

INVENTORS.
MAURICE P. KULP
CHARLES D. VANDENBURGH
BY
Thomas R. O'Malley
Attorney Dec. 23, 1952  M. P. KULP ET AL  2,622,855
APPARATUS FOR PRODUCING VISCOSE
Filed Nov. 19, 1949  3 Sheets-Sheet 3

INVENTORS.
MAURICE P. KULP
CHARLES D. VANDENBURGH
BY Thomas R. O'Malley
ATTORNEY.

Patented Dec. 23, 1952

2,622,855

UNITED STATES PATENT OFFICE 2,622,855

APPARATUS FOR PRODUCING VISCOSE

Maurice P. Kulp, Marcus Hook, Pa., and Charles Douglass Vandenburgh, Charlestown, Md., assignors to American Viscose Corporation, Wilmington, Del., a corporation of Delaware Application November 19, 1949, Serial No. 128,346

13 Claims. (Cl. 259—64)

This invention relates to apparatus for the production of a homogeneous solution or dispersion from a mass consisting initially of a slurry or suspension of a particulate material in a liquid which is a solvating agent for, and which may also be a peptizing agent for the particles. In particular, the invention relates to apparatus for the production of viscose from a slurry comprising particulate cellulose xanthate in a solvating and peptizing agent, for example, dilute sodium hydroxide, and will be discussed in detail in connection with the production of viscose. This application is a continuation-in-part of our copending application Serial No. 746,924 filed May 9, 1947, now Patent 2,539,437, issued January 30, 1951.

Viscose may be regarded as a sol produced from cellulose xanthate by the action of, say, dilute sodium hydroxide, by a series of progressive steps consisting of, first, solvation or hydration, that is, absorption of the hydroxide by the xanthate; second, peptization of the xanthate, that is the schism of the xanthate into micelles; and, third, dispersion of the micelles in the liquid. The production of a homogeneous viscose depends upon access of the solvating and peptizing agent to all portions of the cellulose xanthate. It has been attempted, in the past, to insure the necessary intimate contact of the solvating and peptizing agent with all portions of the xanthate by agitating the two together in a beater equipped with suitable agitating means, for a long time, generally not less than about three hours. Such beating does not bring all portions of the cellulose xanthate into such contact with the peptizing agent as to insure solvation and peptization of all portions of the xanthate and, usually, the mass, after the beating or agitation, is passed through triturators to insure grinding down of the cellulose xanthate particles to expose a maximum of surface of the xanthate to the action of the caustic soda. Even after the agitating and grinding, however, the resulting viscose is not completely homogeneous, but contains minute suspended residual bodies which have resisted complete solvation and peptization and persist in the viscose up to and through the filtering, and spinning or forming steps. Although the residual bodies suspended in the viscose produced in the conventional manner involving beating and grinding of the xanthate and caustic soda are small, and may even be microscopic in size, their presence is readily revealed by the following procedure:

5 grams of Rayox F. F. (pigment variety $TiO_2$) and 5 cc. of distilled water containing 5 drops of a 10% solution of sodium silicate are ground together until all aggregates of the pigment are broken up, usually 5 to 10 minutes. 4 drops of the suspension thus prepared, are added to a 100 gram sample of viscose, and the mixture is stirred until the pigment is evenly distributed through the viscose. The mixture is then deaerated under vacuum. Several drops of the mixture are then placed on a slide, each drop being covered with a cover glass, and the drops are inspected under a microscope equipped with an 8X ocular, and a 10X objective, using dark field illumination. Gels and solid residues present in the viscose are not permeated by the pigment and are readily discernible by contrast with the pigment filled environment.

The residual gel-like materials may affect the spinning operation and the quality of the fibers, in that they may lodge in the orifices of the spinneret and become fixed there so that the viscose, which is delivered to the spinnerets in constant volume and under constant pressure, is forced to flow through the unplugged orifices in increased amounts yielding, from a single spinneret, fibers which exhibit inequalities in denier. On the other hand, the gel-like bodies suspended in the viscose may pass through the orifices of the spinneret without difficulty, but comprise portions of the fibers set up in the bath. It has been determined that the presence of the gels in the fibers adversely affects the tenacity luster and dyeing properties of the fibers. Also in the casting of regenerated cellulose films from viscose, by passing the same through an elongated slit-opening, the residual gel-like material may become lodged in the slit-opening thus obstructing the flow of viscose at that point and producing holes in the sheet or film.

The occurrence of these residual gels suspended in the viscose is not the only disadvantage of conventional viscose-making procedures employing standard apparatus. Although the imposition of a certain amount of mechanical effort is necessary in order to expose a maximum surface of xanthate to the action of the solvent, the prior art processes unavoidably involve a large amount of mechanical working of the mass with restricted exposure of xanthate surface to solvent attack. In those processes, solvation, peptization, and dispersion of the xanthate is not progressive, some portions of the mass being worked upon to an extent greater than is required, while other portions are not worked upon sufficiently to result in conversion of all of the xanthate to viscose. During the agitation or beating, some of the xanthate is peptized, and viscose is produced. However, this viscose is subjected to further working as a component of the mass acted upon in the beater, which working is not required, entails an unnecessary expenditure of power and, most importantly, does not have a favorable effect on the viscose. We have found, actually, that the quality of viscose improves in direct proportion to the reduction in the vigor of the treatment to which the xanthate and solvent are subjected, the less severe the mechanical effort imposed on the mass, the better the quality of the viscose finally obtained.

A further disadvantage of the viscose-making processes currently in use resides in that the beating or agitation to which the mass consisting initially of dilute sodium hydroxide and cellulose xanthate particles is subjected develops heat which must be compensated for by continuously cooling the mass during the agitating and grinding steps. This necessitates the provision of special cooling equipment for externally cooling the mixer or other device in which the mixing by beating and grinding is performed. This cooling is so strong, and the rate at which the material is eventually withdrawn from the mixer is so relatively slow, that increments of almost "frozen" viscose are present in the material finally withdrawn from the mixer. These "frozen" increments exist as strata in the viscose which ripen or age to a different extent than the remaining portions, during the ageing period to which the viscose is subjected customarily, prior to being forwarded to the spinning or other forming stage, making for a very non-uniform final viscose. An incidental disadvantage of the process which depend upon vigorous agitation or beating of the xanthate and liquid for complete solvation and peptization of the xanthate is that during the beating large amounts of air are introduced into the mass. Viscose, as produced by such methods, contains considerable quantities of air bubbles, and must be deaerated before it is spun or molded. Usually, this deaeration is carried out by placing the viscose in a vessel and evacuating the vessel, and is attended by numerous difficulties, as well as being time-consuming.

In addition to all of the foregoing disadvantages inherent in the prior art viscose-making processes, such methods are essentially batch methods which are not adaptable to the production of viscose on a continuous scale.

The primary object of this invention is to provide an apparatus for producing viscose whereby all of the foregoing disadvantages are avoided. Another object is to produce viscose by imposing a minimum amount of mechanical effort on the mass, consisting initially of a mixture of cellulose xanthate particles or crumbs and dilute sodium hydroxide, consistent with maximum exposure of xanthate surface to the action of the liquid. Another object is to provide an apparatus for effecting progressive solvation and peptization of cellulose xanthate. Still another object is to provide an apparatus for producing viscose whereby the mass consisting initially of a slurry or suspension of cellulose xanthate crumbs in a solvating and peptizing agent therefor is continuously homogenized simultaneously with progressive solvation and peptization of the xanthate. A further object is to produce viscose in a very short period of time. Another object is to produce viscose which does not contain air bubbles. It is also an object of the invention to provide an apparatus for producing viscose on a continuous scale, such apparatus being operated and controlled automatically. Other advantages and objects of the present invention will be apparent from the description hereinafter.

These and other objects are achieved by the apparatus of the present invention, in accordance with which the mass consisting initially of a slurry or suspension of cellulose xanthate crumbs or particles and dilute sodium hydroxide or other appropriate potential solvating and peptizing agent for the xanthate is stored under conditions including the creation of non-turbulent homogenizing movements within the stored mass, successive portions, and more specifically converging outer layers, of the stored mass are withdrawn in the form of a film, and the film is rolled, immediately preceding withdrawal, in the nip between closely spaced smooth surfaces rotating at the same peripheral velocity to thereby reduce the thickness of the film.

Specifically, the mass comprising initially the slurry of cellulose xanthate crumbs or particles in dilute sodium hydroxide is stored above and in contact with smooth, closely spaced rollers rotating at the same peripheral velocity so that rotation of the rollers serves both to effect movement within the mass, whereby homogenizing currents are set up therein, and to direct two outer layers of the mass along converging paths until they join as they approach the nip to form a film of the material which is rolled to effect reduction in its thickness and force the solvating liquid into the cellulose xanthate particles to form viscose, which is then withdrawn. The mass consisting initially of the slurry of cellulose xanthate in dilute sodium hydroxide may be passed continuously through one or a plurality of stages at each of which incremental amounts of the mass are stored temporarily and homogenized, successive portions of each of the increments being withdrawn as a film and rolled between the smooth rollers, the withdrawal of a film and rolling thereof being performed continuously. In one embodiment of the invention, the mass consisting initially of the slurry of cellulose xanthate particles and sodium hydroxide is passed, in predetermined amounts and at predetermined intervals of time, through a plurality of stages, and at some stages, incremental amounts of the mass are stored and homogenized under conditions such that there is no withdrawal of a film of the material and rolling thereof, while at other stages, regularly alternating with the first-mentioned stages, the incremental amounts of the mass are stored and homogenized with withdrawal of successive portions of the increment as a film, and rolling of the film between the smooth, rotating surfaces.

In carrying out this embodiment of the invention, the slurry is fed into a machine comprising one or a plurality of hoppers or accumulators the bottom of each of which is constituted by a pair of smooth, closely spaced rollers rotating at the same peripheral velocity in the nip, and, depending upon the directions of rotation of the rollers associated with the hoppers, whether toward or away from the nip, the material which accumulates in the hopper is continuously withdrawn in the form of a film on the surfaces, or is held in the hopper, without withdrawal and rolling of a film thereof. Upon reversal of the directions of rotation of all of the rollers associated with the hoppers, successive portions of the increment held in one hopper are withdrawn as a film by the rollers and delivered to the next succeeding hopper in which the accumulated material is held without withdrawal of any portion thereof on the surfaces of the rotating rollers. Rotation of the rollers in contact with the material stored or accumulated in the hoppers has the effect of moving layers of the stored material of appreciable depth through the mass, whereby currents are set up in the mass, which is thereby kneaded with continuous redistribution of the xanthate particles in the liquid. When the smooth, closely spaced rollers are rotated in the non-feeding direction, that is away from the nip, layers of the increment accumulated in the hopper are moved from points intermediate of the bottom of the mass outwardly to the opposite edges of the increment, upwardly along the opposite edges, and then downwardly, substantially centrally through the center of the increment, thus creating positive but gentle currents or eddies in the material. Rotation of the rollers constituting the bottom of the hopper in the feeding direction, that is, toward the nip, has the effect of moving layers of the mass in directions opposite to the directions of movement of the layers in response to rotation of the rollers in the non-feeding direction. Thus, whether the rollers are rotated in the feeding or non-feeding direction, the material stored temporarily above and in contact with the rollers is kneaded or rolled upon itself first in one direction, and then in the other, and is continuously homogenized. When withdrawal of the increment held in the hopper and rolling of the withdrawn film between the smooth surfaces is performed intermittently, a thorough intermingling of the fresh material introduced into the hopper with material accumulated therein previously is effected.

The homogenization proceeds during withdrawal and rolling of the film as well as when there is no such withdrawal.

In another embodiment of the invention rolling and withdrawing the film between the smooth surfaces is not performed intermittently, but rather, continuously. In this embodiment, the rollers continuously rotate in the feeding direction which rotation of the rollers in contact with the material in the hoppers sets up currents in the mass which is thereby kneaded with continuous redistribution of the xanthate particles in the liquid. In this embodiment, where there is a continuous feed, wiper or doctor blades are positioned when desired so as to contact the lower surface of the rollers to wipe or remove the viscose film therefrom, to conduct the same to the next succeeding hopper or finally to the storage tanks. In order to prevent the overflow of any hopper the wiper blades, i. e., those positioned immediately above in connection with the preceding hopper and rolls, are pivotally mounted and can be removed from contact with the rollers with which they are associated allowing the film to remain in continuous contact with the rotating roller. The overflow prevention mechanism is operated electrically and automatically and is more fully described hereinafter. Although in this embodiment of the invention, any number of sets of rollers and hoppers may be employed, it is preferred to use one or two sets of rollers and hoppers.

The gentle tumbling to which the mass is continuously subjected prior to rolling of the film between the smooth, closely spaced rollers not only continuously effects a change in the environment of the particles with respect to the liquid, but also insures that progressive peptization of the xanthate is not interrupted during temporary storage of the mass, by assuring that fresh surfaces of the particles are continuously exposed to the liquid attack. Continuous homogenization of all portions of the mass is an extremely important feature of the invention because it insures that each aliquot portion of the mass fed to and rolled between the smooth closely spaced rollers comprises essentially the same relative proportion of peptizing liquid to unpeptized cellulose xanthate, thus affording a very precise control over the quality of the viscose produced, which is substantially uniform throughout. In passing between the rollers, the film comprising, in the first instance, particulate xanthate and liquid is subjected to progressively increased pressure which is exerted preferentially upon the particulate or unpeptized xanthate, a minimum amount of pressure being exerted on the fluid portions of the film. The unpeptized xanthate particles present in the film are thus squeezed or pressed to a flattened condition, whereby the surface available to the peptizing action of the liquid is increased. Peptization proceeds at the various rolling stages until, ultimately, the xanthate is completely peptized and the film passing between the rollers consists entirely of the fluid viscose.

In the accompanying drawing, illustrative of the invention,

Figure 1:
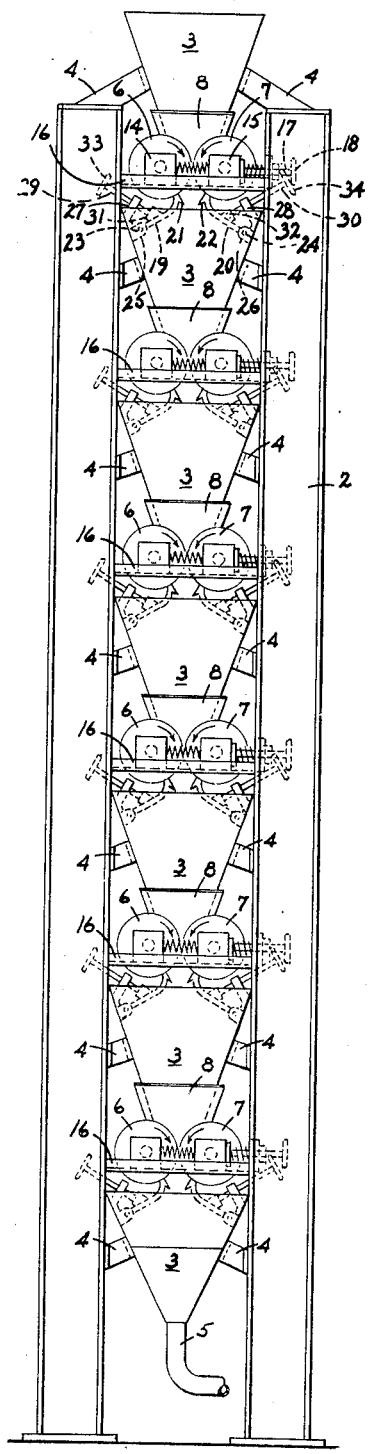
Figure 1 is an end elevation of one embodiment.
Figure 2:
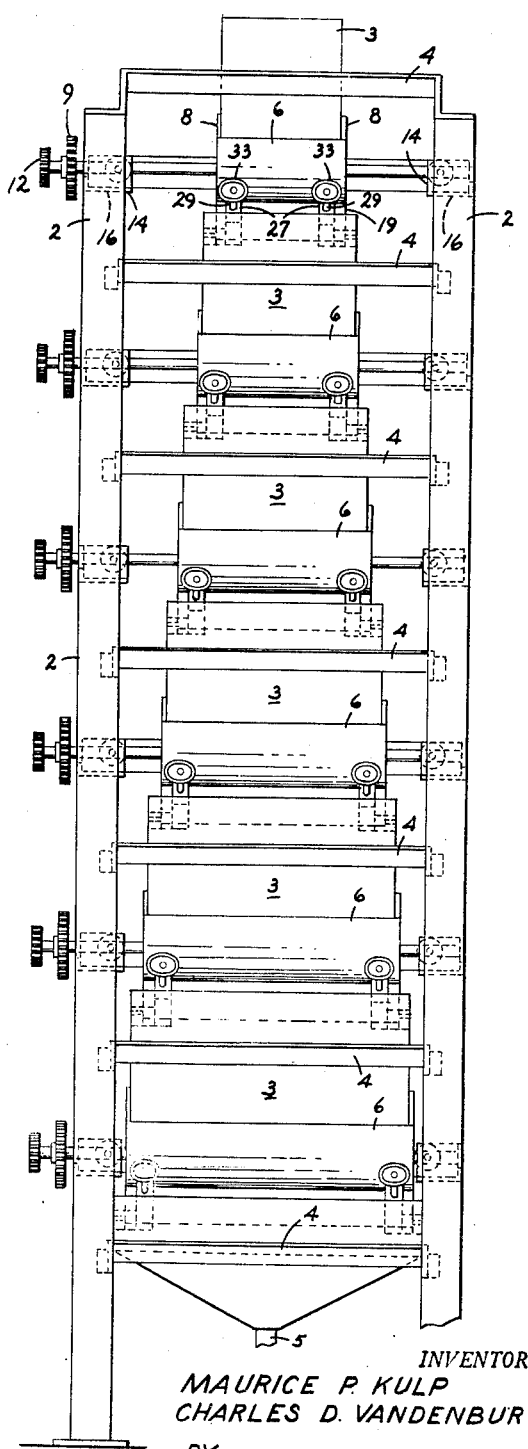
Figure 2 is a front elevation of the apparatus of Figure 1.
Figure 4:
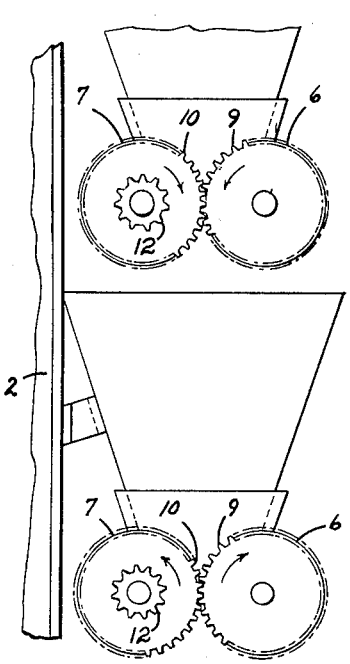
Figure 4 is a diagrammatic illustration of a portion of the apparatus of Figure 3.

Referring to Figures 1 and 2, there is shown a suitable frame 2, in which are mounted, one above the other in the same plane, a plurality (seven being shown) of hoppers 3 supported by cross-members 4 secured to the frame 2. Each of the hoppers 3, with the exception of the lowermost hopper of the series, has an open bottom, the lowermost hopper being connected with a pipe 5 for leading off the viscose. The hoppers comprise downwardly and inwardly converging walls which rest upon the surfaces of smooth, closely spaced rollers 6 and 7, each pair of rollers constituting in effect the bottom of the hopper with which they are associated. Each of the hoppers is provided with end plates 8 which extend to the nip of the rollers to prevent overflow of the material from the machine. All of rollers 6 and 7 have upon their shafts equal spur gears 9 and 10, respectively. Each of rollers 6 is individually driven (by means not shown) through the gears 12 carried on the roller shaft, and in turn drive rollers 7 through intermeshing of the spur gears 9 and 10 (see Figure 4). The roller shafts fit into spring-loaded bearing blocks 14 and 15 mounted on the angle irons 16, bearing blocks 15 being slidable on the angle irons in response to rotation of spring-loaded rods or screws 17 rotatably secured to blocks 15 and provided with a hand wheel 18, for effecting the rotation, to permit lateral adjustment of the rollers and variation in the clearance or gap between them. Curved doctor blades 19 and 20 which fit closely against the bottoms of rollers 6 and 7 are provided for scraping material from the surface of the rollers, the blades having projections 21 and 22 which assist in directing the material scraped off one pair of rollers into the next succeeding hopper in the series. The doctor blades are pivotally secured at 23 and 24 to supporting blocks 25 and 26 secured to the opposite inner walls of the hoppers 3 and having upwardly and outwardly projecting extensions 27 and 28. Movement of the doctor blades toward and away from the rollers is effected by rotation of the threaded rods 29 and 30 rotatably secured to the blades at 31 and 32 and which pass through threaded bores in the extensions 27 and 28 of blocks 25 and 26. Rods 29 and 30 carry hand wheels 33 and 34 for effecting rotation thereof.

The rollers 6 and 7 of each pair of rollers in the series are spaced apart a distance which decreases progressively from the uppermost to the lowermost pair, to provide a gap through the series of rollers which decreases progressively from the top to the bottom of the machine. The film rolled between the rollers is subjected to progressively greater pressing and squeezing with progressive reduction in the thickness of the film at each rolling stage. This progressive decrease in the gap between the rollers in the descending series has the effect of decreasing the rate of feed of the material through the machine and, to compensate for such decreased feed, and since it is preferred to rotate all of the pairs of rollers at equal circumferential speed, the rollers increase progressively in length from the uppermost to the lowermost pair. The hopper associated with each pair of rollers also increases in length. Alternatively, the rollers may all be of the same length, but rotated at circumferential speeds which increase progressively from the uppermost to the lowermost pair in the series.

Figure 6:
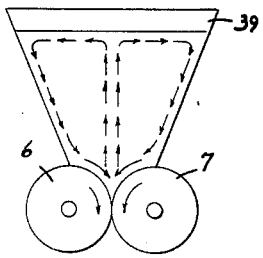
Figure 6 is an enlarged view of a portion of the apparatus shown in Figures 1 and 2.

The arrangement illustrated in Figure 1 is adapted to the continuous production of viscose, all of rollers 6 and 7 being rotated continuously in the direction of the nip to continuously withdraw a portion of the material from the hoppers 3 in the form of a film and roll it between the rollers. In operation, the slurry of cellulose xanthate crumbs and dilute sodium hydroxide is fed into the uppermost hopper 3 from a suitable mixer (not shown) in which the ingredients have been subjected to sufficient mixing to insure intimate physical contact of the liquid and solid particles, at a rate such that an increment of the slurry is accumulated in the hopper. Since rollers 6 and 7 are rotated in the feeding direction, as shown by the arrows, successive portions of the slurry are withdrawn from the hopper, as a film on the surface of the rollers, and is fed into the gap between the rollers, the film being pressed or squeezed between the rollers rotating at the same peripheral velocity in the nip and thereby reduced in thickness. This pressing or squeezing, which effects flattening and thinning of the particles comprising the film, increases the surface exposed to the solvation and peptizing liquid flowing through the nip in the rolls, the liquid acting upon the exposed xanthate surface to effect solvation and peptization of the xanthate. Progressive thinning of the film and solvation and peptization of the xanthate are interrelated and interdependent. The film is scraped off the surface of the rollers and drops into the next succeeding hopper 3, from which it is eventually withdrawn as a film on the surfaces of the rollers constituting the bottom of that hopper. Since the rollers associated with the second hopper are more closely spaced than those associated with the uppermost hopper, the film passing between the second pair of rollers is further decreased in thickness. After pressing or squeezing of the film between the second pair of rollers, the film is scraped off those rollers, and drops into the third hopper of the series, the operations being repeated until all portions of the mass have passed between the six pairs of rollers of the machine. The viscose thus produced is continuously withdrawn from the lowermost hopper, through pipe 5, and directed to a suitable ageing or ripening tank. The incremental portion of the mass which accumulates temporarily in each hopper is continuously homogenized as a result of rotation of the rollers in contact with the bottom of the stored increment, such rotation having the effect of moving layers of the increment generally upwardly substantially centrally through the mass and along the outer opposite edges of the mass, as indicated by the dotted lines in Figure 6 of the drawing. In general, at least the major portion of each fresh charge of material introduced into each of the hoppers, is well mixed with material already accumulated in the hopper, before it is withdrawn by the rotating rollers in the form of the film which is pressed or squeezed between the rollers. If desired, funnel means may be provided for directing the material scraped off the rollers into the hoppers.

Figure 3:
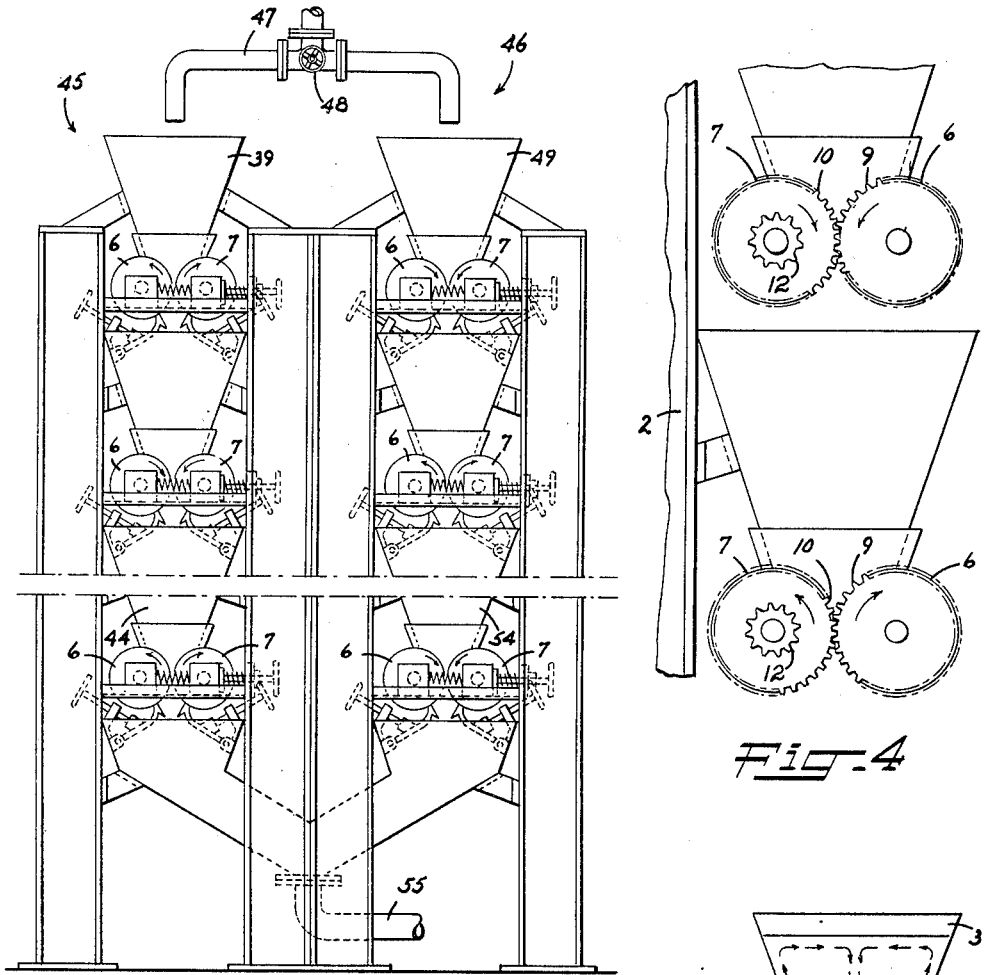
Figure 3 is a broken end elevation of another embodiment of the invention.

The arrangement shown in Figure 3 is illustrative of the embodiment of the invention in accordance with which the material comprising, initially, the slurry of particulate xanthate in dilute caustic soda is stored with intermittent feeding of a film thereof to the nip of the rollers constituting the bottom of the storage hopper, the material being fed between rollers from one hopper into another hopper in which it is held temporarily under conditions in which there is no feeding of the material to the nip of the rollers constituting the bottom of the hopper. The structural details of the parts shown in Figure 3 are similar to those of Figure 1, except that the gears 12 mounted on the roller shafts drive alternate pairs of the rollers 36 and 37 in opposite directions, as shown more clearly in Figure 4. Two machines designated 45 and 46 are shown in Figure 3. Referring to machine 45, when the rollers constituting the bottoms of hopper 39, and succeeding alternating pairs of rollers in the series are rotated in the non-feeding direction, that is, in a direction away from the nip, the rollers constituting the bottoms of the remaining hoppers, including the lowermost hopper 44 (there being six hoppers in the series), are rotated in the feeding direction, or toward the nip. Any suitable means (not shown) including an appropriate timing device may be provided for periodically and simultaneously reversing the direction of rotation of all of the rollers, so that the rollers associated with hopper 39, and the succeeding alternate hoppers are rotated in the feeding direction, while the rollers associated with the remaining hoppers in the series are rotated in non-feeding direction. The directions of rotation of the rollers are reversed at predetermined time intervals depending upon the rate of feed of the slurry to the machine, the clearance between the rollers, the diameter of the rollers, and the circumferential speed thereof, all of which are variable.

Figure 5:
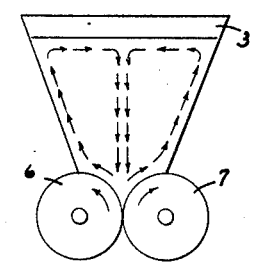
Figure 5 is an enlarged view of a portion of the apparatus shown in Figure 3.

As an example, a machine comprising six pairs of rollers having a diameter of 8", all rotated at a speed of 200 R. P. M., and spaced apart a distance decreasing progressively from .010" for the uppermost pair to .003" for the lowermost pair, and progressively increasing in length from 16" for each roller of the uppermost pair to 64" for each roller of the lowermost pair, and hoppers of progressively increasing length corresponding to the increase in length of the rollers, alternate pairs of rollers in the series being rotated in opposite directions, and the rotation of all pairs being reversed at intervals of 1½ minutes, has been found satisfactory for the production of a homogeneous viscose from a slurry of cellulose xanthate particles in dilute sodium hydroxide delivered to the machine at a rate of 6 lbs. 12 ozs. of cellulose xanthate and 16 lbs. of dilute sodium hydroxide at 1½ minute intervals, 22¾ lbs. of viscose being withdrawn from the machine at 1½ minute intervals. At the start of operations, the rollers 6 and 7 which constitute the bottom of uppermost hopper 39, are rotated in the directions of the arrows. The slurry introduced into hopper 39 is held therein temporarily, and subjected to gentle kneading or rolling in response to rotation of the rollers in contact with the bottom of the mass which rotation has the effect of moving layers of the material of appreciable depth from points intermediate of the bottom of the mass to the opposite outer edges thereof, upwardly along the outer edges and downwardly substantially centrally through the mass, as shown in dotted lines in Figure 5, each portion of the material being moved therethrough before, upon reversal of the direction of rotation of the rollers, successive portions of the mass are withdrawn as a film on the surfaces of the rollers, and the film is rolled to effect pressing or squeezing thereof, with reduction in the thickness of the film. The material scraped from the rollers associated with hopper 39 is delivered to the next hopper, and the rollers associated with that hopper being rotated in the non-feeding direction, when the rollers associated with hopper 39 are rotated in feeding direction, the material delivered to the second hopper is held in that hopper temporarily and homogenized, before, upon reversal of the directions of rotation of all of the rollers of the machine, successive portions of the material are withdrawn from the second hopper by the rollers associated therewith, and delivered to the third hopper in which the material is again allowed to accumulate, and subjected to gentle homogenizing movement within the mass in response to rotation of the rollers constituting the bottom of the hopper in the non-feeding direction. At one stage in the operation, the increments are stored in hoppers 39, and the succeeding alternating hoppers, and fed from the remaining hoppers, while, at another stage, the increments are fed from hoppers 39, and the succeeding alternate hoppers, and stored in the remaining hoppers of the series. This arrangement, whereby the material in the form of a film is intermittently withdrawn and rolled between closely spaced smooth rollers has the advantage that the material held in the hoppers under non-feeding conditions is subjected to gentle but positive kneading which insures intimate intermingling of all portions, including the freshly introduced charges, of the material. This intermingling is effected without turbulence or violent agitation, the converging sides of the hoppers assisting in facilitating streamlined flow or movement of the layers moved through the mass in response to rotation of the rollers in contact with the bottom of the mass, in the non-feeding direction, or away from the nip.

As is obvious, when alternate pairs of the rollers comprising the machine are rotated in a direction opposite to the direction of rotation of the remaining pairs, the viscose is produced intermittently. However, the apparatus may be adapted to continuous production of viscose by operating the two similar machines shown in Figure 3 in side-by-side relation. The two machines 45 and 46 may be placed side by side, and alternately charged with the mass comprising, initially, the slurry of cellulose xanthate crumbs in caustic soda, from the pipe 47 provided with the two-way valve 48 and connected with a suitable source of supply (not shown). In such an arrangement, and as shown in Figure 3, the rollers associated with the hoppers of the machine 45 are always rotated in directions opposite to the directions of rotation of the rollers associated with the corresponding hoppers of machine 46. Thus, when the rollers associated with hopper 39, and succeeding alternate hoppers are rotated in the non-feeding direction, and the remaining rollers of machine 45 including the rollers associated with lowermost hopper 44, are rotated in the feeding direction, the rollers associated with hopper 49 (machine 46), and the succeeding alternate rollers are rotated in the feeding direction, while the remaining rollers of machine 46, including the rollers associated with lowermost hopper 54, are rotated in the non-feeding direction, the directions of rotation of all of the rollers of both machines being simultaneously reversed at the predetermined time intervals. In this manner, once the machines have been set in operation, viscose is produced continuously and delivered to a common reservoir supported below the machines through the pipe 55. As a result of the continuous homogenization of all portions of the mass prior to and simultaneously with rolling of a film thereof to effect pinching or pressing of the film and progressive reduction in the thickness of the film, the increments of viscose produced in the units and delivered to the common reservoir through pipe 55 are substantially uniform.

Figure 7:
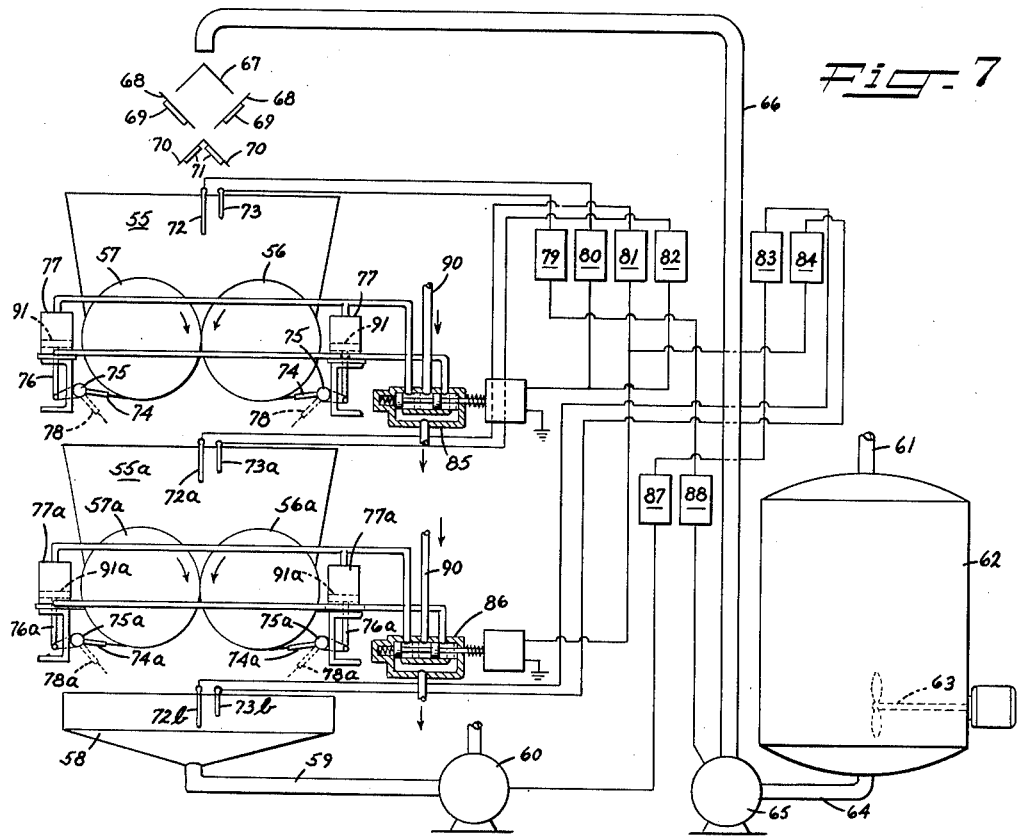
Figure 7 is an end elevation partly in section of another embodiment of the invention.

In the embodiment of the invention shown in Figure 7, the apparatus is also adapted to the continuous production of viscose. Referring to Figure 7, there are shown two hoppers 55, 55a similarly supported as shown in Figures 1 and 2. Each hopper has an open bottom and comprises downwardly and inwardly converging walls which almost touch the surfaces of the smooth closely spaced rollers 56, 57 and 56a, 57a. These rollers form the bottom of the hopper with which they are associated. Each hopper is provided with end plates as in Figures 1 and 2 which extend to the nip of the rollers and conform to their upper surfaces to prevent overflow of the material from the machine. The rollers 56, 57 and 56a, 57a are driven as shown and described in Figures 1 and 4 and are adjustable laterally as there shown. In this embodiment, however, all the rollers are driven in the same direction, namely the feeding direction, throughout operation as indicated by the arrows.

Under the bottom hopper is a funnel-shaped hopper 58 from the bottom of which extends a pipe 59 leading to a pump 60 which removes the fluid viscose to storage tanks not shown.

The slurry of cellulose xanthate crumbs and dilute sodium hydroxide coming from the churn mixer units, in batch-like manner, is fed by means of pipe 61 into a large tank 62 wherein the material is stirred by agitator 63. The slurry is fed from the tank through the pipe 64 to the pump 65 which pumps the material through the pipe 66 up into the first hopper 55. As the slurry leaves the pipe 66 it strikes an inverted V-shaped baffle 67 which directs the same against the metal plate 68 having magnets 69 on their underside. The slurry then drains from the plates and strikes the inverted V-shaped baffle 70, having magnets 71 on its underside, then passes to the first hopper. The purpose of the magnets is to remove any foreign metallic particles which may have been picked up by the slurry in passage through the system.

Doctor blades 74, 74a fit closely against the bottoms of rollers 56, 57 and 56a, 57a respectively when the solenoid controlled spool valves are de-energized. These blades are pivotally mounted at 75, 75a and are actuated by the rods 76, 76a connected to the air cylinders 77, and 77a respectively. The purpose of the blades is to scrape the material from the surface of the rollers into the next succeeding hopper. When actuated, the blades drop away from the rollers and assume the dotted line positions shown at 78, 78a. When the blades are in dropped position, the material clings to the rollers and is carried around back into the hopper from which it emerged, thus preventing any material from proceeding to the next succeeding hopper.

In this embodiment of the invention, the hoppers and rollers are all of the same size in contradistinction to that embodiment shown in Figures 1 and 2 wherein the hoppers increase in size and the rollers increase in length proceeding from the top to the bottom of the assembly to compensate for decrease in feed due to decrease in the gap between the rollers. The gap between the rollers may be the same size in each set but preferably the gap decreases in size proceeding from the upper to the lowermost set of rollers. The width of the gap between the rollers may be varied between .030 and .003 inch. If the hoppers and rollers were the same size, with decreasing gap as outlined above, there would be a danger that the lower hoppers would overflow. In the present embodiment the danger of the hopper overflowing is controlled by an automatic electrical system shown in Figure 7 which in turn is actuated by the slurry or viscose coming in contact with the probes 72, 73 and 72a, 73a extending into the top of the hoppers 55 and 55a respectively.

At the start of the operation of the apparatus, the contacts in the electronic relays 79 to 84 inclusive are closed, the coils in the four-way solenoid-controlled spool valves 85 and 86 are energized as shown by the dotted lines in Figure 7 and the doctor blades are in dotted line positions 78, 78a off the rolls. Valves 85 and 86 may be of the conventional type used in pneumatic and hydraulic systems. The line 90 is connected to an air pressure supply which moves the pistons 91 in the cylinders 77 up and down. Rotation of the rollers is started and the supply pump 65 started thus feeding the viscose slurry to the top hopper 55 of the apparatus.

When the viscose in the hopper 55 reaches or grounds out the probe 72, contacts in the electronic relay 80 are opened, de-energizing the solenoid valve 85, moving the spool valve to the solid line position shown in Figure 7, thus allowing the air to escape from cylinders 77, which swings the doctor blades 74 against rolls 56 and 57 and the viscose is wiped off the rolls into the hopper 55a. When the viscose in hopper 55a reaches the probe 72a, the contacts in the electronic relay 81 are opened de-energizing the solenoid valve 86, moving the spool valve to the solid line position shown, thus allowing the air to escape from cylinders 77a which swings the doctor blades 74a against rolls 56a and 57a and the viscose is wiped off the rolls into hopper 58. When the viscose in hopper 58 reaches the probe 72b, the contacts in the electronic relay 83 are opened and the circuit closes in the starter 87 for the motor driving the pump 60 which takes the viscose from the hopper 58 to the viscose storage cellar (not shown).

If the viscose should reach probe 73 in hopper 55, the contacts in electronic relay 79 are closed breaking the circuit in starter 88 for the motor which drives pump 65. This stops the viscose supply pump 65 thus preventing the addition of any more viscose to hopper 55 relieving the danger of overflowing the same. If the viscose reaches the probe 73a in hopper 55a, contacts in electronic relay 82 are closed, the solenoid valve 85 is energized taking doctor blades 74 away from rollers 56 and 57, and the viscose continues on around the rollers so that none falls into hopper 55a. If the viscose reaches probe 73b in hopper 58, contacts in electronic relay 84 are closed, the solenoid valve 86 is energized taking doctor blades 74a away from rollers 56a and 57a, and the viscose continues on around the rollers so that none falls into hopper 58.

As the viscose recedes below the end of each probe mentioned above, or breaks the ground, the reverse operation automatically takes place as when it was grounded out. The function of the control system explained herein is to maintain predetermined levels of viscose in each hopper. With this system it is a simple matter to change the capacity of the apparatus, within reasonable limits, by simply changing the speed of the lower set of rolls, or changing the size of all the rollers, i. e., the diameter and length of the rollers are variable depending upon the results desired. Although both sets of rolls may be operated at the same speed it is preferred to operate the lower set, namely 56a and 57a, at a faster rate since the clearance of the same is preferably less than the above set. As a specific example of this, which is merely intended to be illustrative and not limitative, since the size, speed and clearance of the rolls are variable depending on the results desired, the apparatus can handle 2,242 gallons of viscose per hour when the top set of rollers (56 and 57), 48 inches in length and having a diameter of 24 inches, are operated at a speed of 52 R. P. M. and have a clearance of 0.030 inch and the bottom set of rollers (56a and 57a), of the same size as the top set of rollers, are operated at a speed of 72 R. P. M. and have a clearance of 0.020 inch.

One or more sets of rollers and hoppers may be employed in the apparatus of Figure 7 with the same type of overflow control system. The overflow control system may also be used in conjunction with the apparatus shown in Figures 1 and 2, whether operated intermittently or continuously. It is particularly advantageous in this connection when the apparatus is operated continuously. If desired, the receptacles or hoppers above the rollers may be omitted and the viscose slurry passed through the superposed pairs of rollers. Also, the entire assembly of superposed pairs of rollers may be entirely enclosed within a closely fitting housing having an entrance at the top and an exit at the bottom. In an embodiment such as the latter, the entire system may be sealed or closed when used with materials subject to attack when in contact with the atmosphere.

Figure 8:
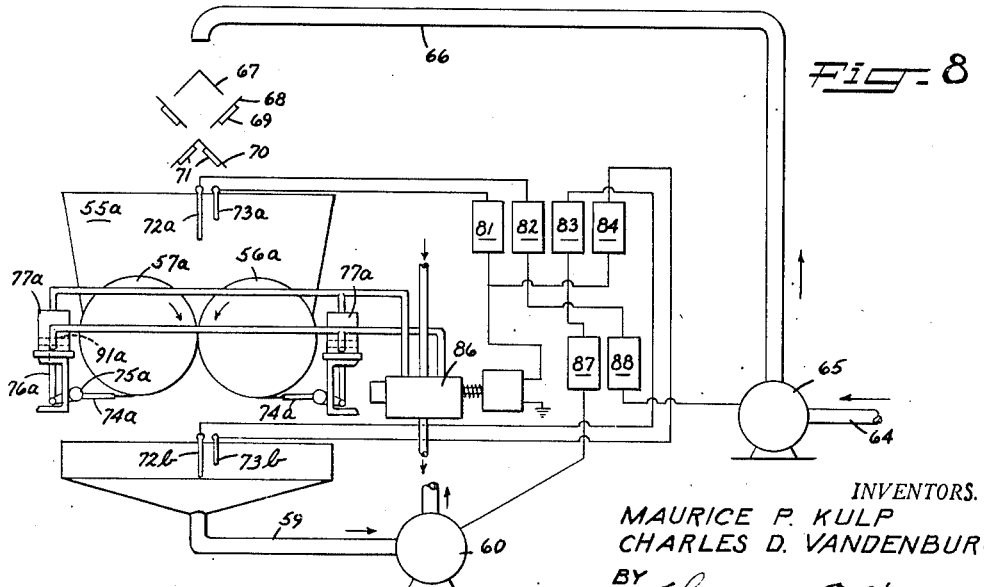
Figure 8 is an end elevation of another embodiment of the invention.

The upper set of rolls shown in Figure 7 may be omitted in which case the system shown in Figure 8 results and the xanthate is fed directly through the magnetic separator system to the roll system 56a, 57a and from these rolls into the receiving hopper 58. When using the single set of rollers or single pass disintegrator the speed and clearance of the rolls must be readjusted, i. e., the clearance and speed would be less in order to allow more time for homogenization of the viscose in the hopper. The advantage of the single pass disintegrator is its simplicity of installation and operation. The single pass disintegrator can be operated at a capacity of approximately 2,000 pounds of dry pulp per hour.

It is of the essence of the invention that the mass comprising initially a slurry of cellulose xanthate particles in, say, dilute sodium hydroxide, is converted to a completely homogeneous viscose without, at any time, subjecting the mass to vigorous agitation such as is commonly resorted to, or to grinding or rubbing action. Progressive solvation and peptization of the xanthate is effected by continuously exposing fresh xanthate surfaces to the liquid attack. The particles are not torn or shredded as they pass through the smooth closely spaced rollers rotating at the same peripheral velocity in the nip, but are merely squeezed and flattened whereby fresh xanthate surface is presented to the solvating and peptizing liquid. The viscose is thus produced under conditions such that a minimum amount of mechanical effort is imposed upon the unpeptized cellulose xanthate, the amount of mechanical effort imposed upon already peptized xanthate being negligible, at most. This method involving continuous homogenization of the mass consisting initially of the slurry of cellulose xanthate particles in the solvent, and progressive peptization of the xanthate with minimum mechanical effort has the extremely important advantage that all of the xanthate particles are acted upon positively and progressively by the liquid without subjecting the material to agitation or beating, or imposing any mechanical effort upon the material tending to develop excessive heat, the viscose obtained having substantially the same temperature as the slurry entering the system. Thus, when a slurry having a temperature of 18° C. was converted to viscose in the manner described herein, the viscose was found to have a temperature of 19° C., the conversion being effected in the absence of any extraneous cooling means associated with the machines. The viscose is thus entirely free of strata, such as are characteristic of viscose obtained by subjecting cellulose xanthate particles and liquid to agitating and beating, under positive cooling. The viscose is completely homogeneous, and is free from suspended gels or undissolved particles, as evidenced by analysis of numerous samples of the viscose by the so-called titanium dioxide technique described above.

Another marked advantage of the invention is that the viscose produced is comparatively free from gas bubbles, whereby the deaeration is greatly simplified. Any gas present in the slurry introduced into the system initially is substantially released as the material proceeds through the system.

The invention not only has the advantage that it results in the production of viscose which is homogeneous and of superior quality, but, in addition, the viscose is produced in a period of time which is very much shorter than the time required to produce viscose by conventional methods. Thus in accordance with the invention the viscose is produced in about ten minutes, maximum time, as compared to the 2½ to 3 hours required ordinarily, and, moreover, may be produced continuously.

Although the invention has been described in detail in connection with the production of viscose from a slurry of particulate cellulose xanthate in dilute sodium hydroxide, it will be obvious that the invention may be practiced for the production of a homogeneous solution, which term is used herein as embracing true solutions, as well as colloidal solutions or sols of the type of viscose, from a slurry or suspension of other particulate material in a liquid which is at least a solvating agent for the particulate material. Thus a slurry of any particulate material in a solvating agent, which may also be a peptizing agent, therefor may be stored under conditions inducing the creation of homogenizing currents therein and rolled, in the form of a film between smooth, closely spaced rollers rotating at the same peripheral velocity in the nip, in accordance with the invention, until, with progressive exposure of the surface of the particles to the action of the liquid, and progressive reduction in the thickness of the film, all portions of the particles are acted upon by the solvent, and a homogeneous solution is produced.

The apparatus specifically illustrated and described herein may be modified to decrease or increase the number of units each comprising a hopper and smooth rollers constituting the bottom of the hopper arranged in series in the same plane, depending upon the particular material being treated.

Other modifications may be made in practicing the invention as specifically described and illustrated herein, without departing from the spirit and scope of the invention which is not to be limited, therefore, except as defined in the appended claims.

We claim:

1. An apparatus for the production of homogeneous solutions and dispersions comprising at least two receptacles each comprising side walls and a bottom wall constituted by a pair of smooth, closely spaced rollers of equal diameter and length, said receptacles being arranged one above the other, scraping means supported below each of the rollers and movable toward and away from the surfaces of the rollers, pneumatic means for moving the scraping means, electrical means comprising probing means extending into the tops of the receptacles and responsive to contact with the material in the receptacle for actuating the pneumatic means, and means for rotating all of the rollers in the feeding direction and at the same peripheral velocity in the nip.

2. An apparatus as defined in claim 1 provided with means for rotating the lowest pair of rollers at a faster peripheral velocity in the nip than the upper rollers.

3. An apparatus for the production of homogeneous solutions and dispersions comprising superposed pairs of smooth, closely spaced rollers, scraping means supported below each of the rollers and movable toward and away from the surfaces of the rollers, pneumatic means for moving the scraping means, electrical means comprising probing means extending down toward the nip of the rollers, and responsive to contact with the material for actuating the pneumatic means, and means for rotating all of the rollers in the feeding direction.

4. An apparatus for the production of homogeneous solutions and dispersions comprising a receptacle comprising side walls and a bottom wall constituted by a pair of smooth, closely spaced rollers of equal diameter and length and a hopper immediately below the receptacle, scraping means supported below each of the rollers and movable toward and away from the surfaces of the rollers, pneumatic means for moving the scraping means, electrical means comprising probing means extending into the tops of the receptacle and hopper and responsive to contact with the material for actuating the pneumatic means, and means for rotating the rollers in the feeding direction.

5. An apparatus for the production of homogeneous solutions and dispersions comprising a receptable comprising side walls and a bottom wall constituted by a pair of smooth, closely spaced rollers of equal diameter and length and a hopper immediately below the receptacle, scraping means supported below each of the rollers and movable toward and away from the surfaces of the rollers, pneumatic means for moving the scraping means, electrical means comprising probing means extending into the tops of the receptacle and hopper and responsive to contact with the material for actuating the pneumatic means, magnetic separating means positioned above the receptacle in the path of the material entering the receptacle, and means for rotating the rollers in the feeding direction.

6. An apparatus as defined in claim 5 wherein the pneumatic means comprise cylinders having pistons therein attached to the scraping means, automatically operated valve means, and conduit means connecting the cylinders to the valve means, and wherein there is provided electrical means connecting the probing means to the valve means.

7. An apparatus for the production of homogeneous solutions and dispersions comprising a receptacle comprising side walls and a bottom wall constituted by a pair of smooth, closely spaced rollers of equal diameter and length and a hopper immediately below the receptacle, scraping means supported below each of the rollers, pneumatic means for moving the pistons therein attached to the scraping means, solenoid actuated two-way valve means, and conduit means connecting the cylinders and valve means, probing means extending into the top of the receptacle and hopper, electric conductors connecting the probing means through relay means to the solenoid, said probing means being responsive to contact with the material for actuating the solenoid, and means for rotating the rollers in the feeding direction.

8. An apparatus for the production of homogeneous solutions and dispersions comprising two receptacles each comprising side walls and a bottom wall constituted by a pair of smooth, closely spaced rollers of equal diameter and length, said receptacles being arranged one above the other, scraping means supported below each of the rollers and movable toward and away from the surfaces of the rollers, means for moving the scraping means, means for independently actuating the scraper moving means associated with each pair of rollers, said actuating means comprising probing means at a predetermined level in the respective receptacle and responsive to contact with the material in the receptacle for initiating operation of the actuating means, and means for rotating all of the rollers simultaneously.

9. An apparatus as defined in claim 8 wherein the nip of the lower pair of rollers is smaller than that of the upper pair of rollers.

10. An apparatus as defined in claim 8 wherein the nip of all the pairs of rollers is the same.

11. An apparatus as defined in claim 8 wherein there are means for rotating the lower pair of rollers at a faster peripheral velocity in the nip than the upper pair of rollers.

12. An apparatus for the production of homogeneous solutions and dispersions comprising at least one receptacle comprising side walls and a bottom wall constituted by a pair of smooth, closely spaced rollers of equal diameter and length forming a nip therebetween, scraping means supported below each of the rollers and movable toward and away from the surfaces of the rollers, means for moving the scraping means, electrical means for actuating the scraper moving means, said electrical means comprising probing means extending into the top of the receptacle and responsive to contact with the material in the receptacle, and means for rotating the rollers in the feeding direction at the same peripheral velocity in the nip.

13. An apparatus for the production of homogeneous solutions and dispersions comprising a receptacle comprising side walls and a bottom wall constituted by a pair of smooth, closely spaced rollers of equal diameter and length and a hopper immediately below the receptacle, scraping means supported below each of the rollers and movable toward and away from the scraping means, means for moving the scraping means, electrical means for actuating the scraper moving means, said electrical means comprising probing means extending into the tops of the receptacle and hopper and responsive to contact with the material for initiating actuation of the electrical means, and means for rotating the rollers in the feeding direction.

MAURICE P. KULP.
CHARLES DOUGLASS VANDENBURGH.

REFERENCES CITED

The following references are of record in the file of this patent:

UNITED STATES PATENTS

| Number | Name | Date |
| --- | --- | --- |
| 1,024,168 | Williams | Apr. 23, 1912 |
| 1,349,221 | Nolen | Aug. 10, 1920 |
| 1,671,868 | McGougan | May 29, 1928 |
| 2,182,131 | Meade | Dec. 5, 1939 |
| 2,368,672 | McNamara | Feb. 6, 1945 |
| 2,414,855 | Cormell | Jan. 28, 1947 |